3,564,023
1,4-BIS-(TRIS(NF₂)METHOXY)-2-BUTENE OXIDE AND POLYMER THEREOF
Eugene L. Stogryn, Fords, Joel G. Berger, Elizabeth, and Lawrence J. Engel, Dunellen, N.J., assignors to Esso Research and Engineering Company, a corporation of Delaware
No Drawing. Filed July 29, 1964, Ser. No. 386,088
Int. Cl. C07c *93/10;* C07d *1/18*
U.S. Cl. 260—348                                  10 Claims This invention relates to the novel and useful compound 1,4 - bis - [tris(NF₂)methoxy] - 2 - butene oxide, polymers thereof, and their synthesis. This new epoxide which contains one NF₂ group per carbon atom has the following structural formula:

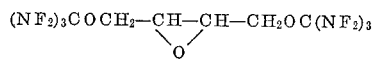

The abbreviation FABDE is used to name this monomer. Because of the high NF₂-content (71%) and the reaction properties of this epoxide, it is adapted for use as an oxidizer or as an intermediate in the synthesis of useful higher molecular weight liquid and solid oxidizers, which are suitable components for advanced solid propellant formulations. The energetic epoxide can be prepared and isolated as either the cis or trans isomer. In making these high NF₂-content epoxides, the functional epoxide group through which polymerization can be effected is preserved, and the resulting polymers can be made to contain the same proportion of NF₂ as is present in the monomeric epoxides, even in an extensive polymerization to solid polymers.

With previously prepared NF₂-containing polymers of relatively low NF₂-content for use as oxidizer-binder components of solid rocket propellant formulations, the solid component of the binder has been kept generally in the proportion of 10 to 20 wt. percent of the total formulations to obtain a high specific impulse value. With binders having less than one NF₂ group per carbon atom, a serious loss of theoretical I$_{sp}$ at high binder content levels occurs. Now, use of the polymers derived from FABDE enables formulations to be made with greater percentages of binder without significant loss of theoretical I$_{sp}$. A higher binder content permits a solid propellant formulation to have better physical and dynamic properties, i.e., greater strength, greater tenacity, less creep, etc.

In accordance with the present invention, the new high energy epoxide is prepared by reacting 1,4-dihydroxy-2-butene oxide, either the cis or trans isomer, with perfluoroguanidine in an adductive reaction, and the resulting adduct is fluorinated. The synthetic route is given as follows:

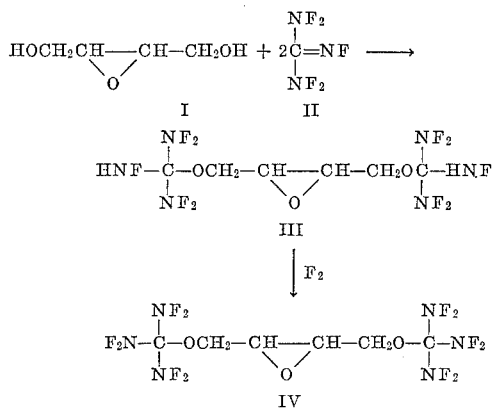

In this synthesis the starting reactant I is 1,4-dihydroxy-2-butene oxide. The perfluoroguanidine reactant is II, the adduct is III, and the fluorinated adduct termed FABDE is IV.

The perfluoroguanidine is a compound synthesized by fluorinating a salt of guanidine, e.g., guanidine carbonate, dissolved in distilled water at an adjusted pH, preferably 5 to 6, by addition of aqueous HF. The perfluoroguanidine undergoes an addition reaction with the hydroxy function, and in the present instance it was important to determine that the perfluoroguanidine addition and subsequent fluorination would not destroy the epoxide ring.

The cis isomer of 1,4-dihydroxy-2-butene oxide is prepared by epoxidation of commercially available cis-1,4-dihydroxy-2-butene. Using the cis isomer as the reactant I, the preparation of the hexakis NF₂ derivative was made as described in the following example.

EXAMPLE 1

Preparation of cis-1,4-bis-[tris(NF₂)methoxy]-2-butene oxide (FABDE)

A pressure reactor was charged with 2.52 g. of cis-1,4-dihydroxy-2-butene oxide, 0.168 g. urea, 30 ml. of acetonitrile, and 12 g. of perfluoroguanidine. The reaction was stirred at room temperature overnight. After removal of the unreacted gases a 35% F₂/N₂ stream was passed over the surface of the acetonitrile solution for 4.5 hours. During the fluorination the temperature in the reactor was maintained at −25° C.

After stripping off the acetonitrile the viscous residue was dissolved in Freon 113 or CCl₄ and dried with anhydrous Na₂CO₃. The solution was filtered and the solvent blown off. The residue was placed on a silica gel column (the silica gel had previously been treated with caustic, H₂O, and dried at 600° F. for 6 hours) with a minimum amount of CCl₄. Elution with CCl₄ gave 7.9 g. (74%) of cis-1,4-bis-[tris(NF₂)methoxy]-2-butene oxide having a purity of 96+%.The N.M.R. and infrared spectrum together with the elemental analysis proved the formation of the bis adduct.

Calculated for C₆H₆O₃N₆F₁₂ (percent): C, 16.45; N, 19.18; F, 52.03. Found (percent): C, 16.88; N, 19.31; F, 53.30.

To make the trans-FABDE the reactant, compound I, is the trans dihydric oxide which was prepared by the epoxidation of trans-1,4-dihydroxy-2-butene. The trans-1,4-dihydroxy-2-butene is readily obtained from the caustic treatment of commercially available trans-1,4-dichloro-2-butene. The trans isomer reactant was used in making the hexakis NF₂ derivative as shown in the following example.

EXAMPLE 2

Trans-1,4-bis-[tris(NF₂)methoxy]-2-butene oxide

A pressure reactor was charged with 0.45 g. of trans-1,4-dihydroxy-2-butene oxide, 0.026 g. of urea, 6 ml. of acetonitrile, and 1.788 g. of perfluoroguanidine. The reaction mixture was stirred at room temperature overnight. After removal of the unreacted gases a 10% F₂/N₂ stream was passed over the surface of the reaction mixture for 2 hours at 0° C.

Working up the reaction product in a manner similar to that described in Example 1 yielded 1.4 g. (74%) of trans-1,4-bis-[tris(NF₂)methoxy]-2-butene oxide having a purity of >90%.

Calculated for C₆H₆O₃N₆F₁₂ (percent): C, 16.45; N, 19.18; F, 52.03. Found (percent): C, 16.95; N, 19.17; F, 53.4.

The infrared and N.M.R. spectrum are consistent with the structure for the trans isomer.

Containing a high proportion of NF₂, the 1,4-bis-[tris(NF₂)methoxy]-2-butene oxide monomer is in itself a monopropellant or oxidizer that may be used in a propellant formulation, but its epoxide function makes this compound particularly interesting for use in preparing polymers preferred as binders in a propellant formulation. It remained to be determined whether these monomers could be polymerized satisfactorily to high molecular weight polymers or advantageously to solids without loss of fluorine. In initial efforts to polymerize the epoxide monomer, a large number of catalysts were tried including $PF_5$, $PF_5$·tetrahydrofuran, butyl lithium, triethyl aluminum, diethyl aluminum chloride, ethyl aluminum dichloride, potassium hydroxide, sodium methoxide, $BF_3$, $BF_3$·$Et_2O$, titanium tetrachloride, stannic chloride, and others. In many attempts to polymerize there was difficulty in obtaining polymers except with strong Lewis acids such as $BF_3$, $TiCl_4$, or $SnCl_4$. Various solvents were used as media for the polymerization, e.g., liquid $SO_2$, $CH_2Cl_2$, benzene, and others. Various polymerization modifiers were also used including 1,4-dihydroxy-2-butene oxide, trimethylol propane, epichlorohydrin and ethylene glycol.

EXAMPLES 3-8

In Examples 3 to 8 the FABDE and modifier and solvent, when indicated in Table I, were measured into a suitable container and the required amount of catalyst was introduced at the prescribed temperature. After the specified time the polymer was dissolved in methylene chloride, treated with aqueous $Na_2CO_3$, and dried over $Na_2CO_3$. The polymer was then isolated by removal of the solvent.

plasticizer, the effect of raising the $NF_2$ content of the 1,4-bis-[tris($NF_2$)methoxy]-2-butene oxide polymer is shown in the following table.

TABLE II.—SOLID ROCKET PROPELLANT FORMULATION

[Binder: Polymer-hexakis ($NF_2$) propyl ether plasticizer; nitronium perchlorate, oxidizer; boron powder, fuel.]

| Wt. ratio, polymer plasticizer | Percent $NF_2$ binder | Maximum $I_{sp}$ |
|---|---|---|
| 100/0 | 71.2 | 293.9 |
| 75/25 | 72.5 | 294.9 |
| 50/50 | 73.8 | 295.8 |

Using the 1,4-bis-[tris($NF_2$)methoxy]-2-butene oxide polymer of approximately 71% $NF_2$ with an equal amount of plasticizer having the composition

which contains 81.2% $NF_2$ and with a difluoramino oxidizer such as [($NF_2$)$_3$COCH$_2$]$_3$CNO$_2$ with nitronium perchlorate, a propellant composition having an $I_{sp}$ of 302 is obtained.

The composition of the 1,4-bis-[tris($NF_2$)methoxy]-2-butene oxide polymers without modifying agents and in its purest form is defined by the following formula which gives the recurring monomeric unit:

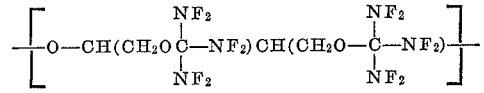

TABLE I

| Example | Catalyst | Mole percent | Solvent | Volume percent | Modifier | Mole percent | Temperature, °C. | Time, hrs. | Mol. wt. |
|---|---|---|---|---|---|---|---|---|---|
| 3 | SnCl$_4$ | 10 | | | | | 25 | 16 | 1,403 |
| 4 | SnCl$_4$ | 12 | CH$_2$Cl | 30 | DBO a | 4 | 0, 25 | 2, 16 | 1,760 |
| 5 | BF$_3$·H$_2$O | 10 | CH$_2$Cl$_2$ | 50 | | | 25 | 72 | 1,460 |
| 6 | BF$_3$ | 10 | SO$_2$ | 50 | TMP b | 5 | 25 | 16 | 2,825 |
| 7 | SbCl$_5$ | 5 | CH$_2$Cl$_2$ | 25 | Glycerol | 10 | 0, 25 | 2, 120 | 1,825 |
| 8 | SbCl$_5$ | 2 | | | H$_2$O | 10 | 25 | 18 | 854 | a DBO=1,4-dihydroxy-2-butene oxide.
b TMP=1,1,1-trimethylol propane.

The hydroxyl content of the polymers was measured and determined that the polymers contained sufficient hydroxyl groups to permit conversion to solid urethanes. In the conversion to urethanes the liquid polymer was reacted with toluene diisocyanate, catalyzed by stannous octanoate giving a stiff taffy consistency in 8 hours at 50° C.

Although the solid plastic binders can thus be obtained from the liquid polymers of 1,4-bis-[tris($NF_2$)methoxy]-2-butene oxide, it was finally found that this epoxide could be polymerized into high melting point solids having the desirable high $NF_2$ content. These high melting point solid polymers and method of preparing them using preferably SbCl$_5$ as the catalyst is described in the U.S. application Ser. No. 386,087 filed by D. S. Bosniack, E. L. Stogryn and J. G. Berger on July 29, 1964, now U.S. Pat. No. 3,441,520. It was found that this solid polymer has an excellent stability, high melting point, is easily prepared and supplies a very useful solid for advanced solid propellants which are to have $I_{sp}$ values from 290 to above 300. These polymers are well adapted for use with high $NF_2$-content liquid plasticizers being compatible therewith, as for example, with hexakis($NF_2$)propyl ether which has the formula:

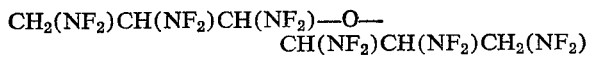

This important oxidizer-plasticizer has been shown to be readily made by reaction of 1,2-divinyl ethylene oxide with $N_2F_4$ as disclosed in U.S. application Ser. No. 246,869, filed by E. L. Stogryn and M. H. Gianni on Dec. 17, 1962. The hexakis($NF_2$)propyl ether, which may also be more specifically named as di-[1,2,3-tris($NF_2$)]n-propyl ether can be prepared to have a high purity and high $NF_2$ content of 76%. Using this compound as the Two or more of these units may be linked together to form the polymers. These polymers may be made either from the cis monomer or the trans monomer. The polymerization temperatures used may be in the range of about 0° to 60° C.

The properties of these $NF_2$-containing butene oxide polymers have been extensively studied and compared with other $NF_2$-polymers obtainable up to the present time. In determining the usefulness of these polymers as solid rocket propellant ingredients, they have been found to have exceptional important properties with respect to thermal stability, compatibility with available high-energy co-ingredients such as the leading plasticizer, hexakis($NF_2$) dipropyl ether, the low sensitivity and exceptionally low impact sensitivity which is desirable for handling.

The solid $NF_2$-containing butene oxide polymer with a melting point of 202° to 204° C. in a vacuum thermal stability test evolved less than 2.7 cc. gas per gram of the polymer in 100 hours at 90° C. and evolved no gas at 100 hours at 60° C.

A thermal stability test on the polymer plasticized with the energetic oxidizer hexakis($NF_2$)dipropyl ether evolved no more than 1.1 cc. of gas per gram in 100 hours at 60° C.

The solid polymer exhibited exceptional impact insensitivity, measuring 23 kg. cm. It had one of the highest auto ignition temperatures, 253° C. for a 5-second induction period, compared to other polymers of similar $NF_2$ content.

Based on reproducibility, obtainable use and simplicity of preparation and of purification, these $NF_2$-containing butene oxide polymers were found outstanding compared to other $NF_2$-containing polymers of similar $NF_2$ content.

In the properly catalyzed polymerizations of the monomer, the conversion is high and can be substantially quantitative. The ratio of the liquid polymer to solid polymer is determined by the particular conditions employed. The monomer has been polymerized to high yields of high melting point solids without use of a solvent but it was found more convenient to use solvents, the solvents being employed, Freon 113, pentane, $CH_2Cl_2$, benzene, and the like.

The invention described is claimed as follows:

1. The compound 1,4-bis-[tris($NF_2$)methoxy]-2-butene oxide having the formula:

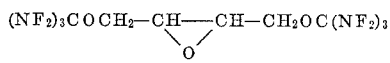

2. The compound cis-1,4-bis-[tris($NF_2$)methoxy]-2-butene oxide.

3. The compound trans-1,4-bis-[tris($NF_2$)methoxy]-2-butene oxide.

4. The liquid polymers of polymeric 1,4-bis-[tris($NF_2$)methoxy]-2-butene oxide having the recurring monomeric unit composition:

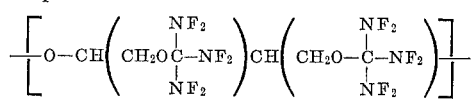

5. The method of preparing 1,4-bis-[tris($NF_2$)methoxy]-2-butene oxide which comprises reacting cis-1,4-dihydroxy-2-butene oxide with perfluoroguanidine to form a resulting adduct of the perfluoroguanidine therewith, fluorinating the resulting adduct to form cis-1,4-bis-[tris-($NF_2$)methoxy]-2-butene oxide.

6. The method of preparing trans-1,4-bis-[tris($NF_2$)methoxy]-2-butene oxide which comprises reacting trans-1,4-dihydroxy-2-butene oxide with perfluoroguanidine to form a resulting adduct and fluorinating said adduct to obtain the trans - 1,4 - bis - [tris($NF_2$)methoxy]-2-butene oxide.

7. The method of making the polymers of 1,4-bis-[tris-($NF_2$)methoxy]-2-butene oxide which comprises polymerizing 1,4-bis-[tris($NF_2$)methoxy]-2-butene oxide as monomer at temperatures in the range of about 0° to 60° C.

8. The method of claim 7, wherein a catalyst is present to catalyze the polymerization.

9. The method of claim 7, wherein the monomer is polymerized in a solvent.

10. The method of claim 7, wherein the monomer is polymerized with a reacting modifier present.

References Cited

Hoffman et al.: Chem. Reviews, vol. 62, pp. 12–18 (1962).

LELAND A. SEBASTIAN, Primary Examiner

U.S. Cl. X.R.

149—19, 109; 260—2, 584